US011912384B2

(12) United States Patent
Bainter et al.

(10) Patent No.: US 11,912,384 B2
(45) Date of Patent: Feb. 27, 2024

(54) AUTOMATION OF FLOTATION DEVICES

(71) Applicants: Jimmy R. Bainter, Gravois Mills, MO (US); Michael L. Eckstein, New Orleans, LA (US); Lawrence E. Guerra, Mission, KS (US); William R. Hendricks, Olathe, KS (US); Steven R. Walton, Overland Park, KS (US); Joshua H. Huisenga, Overland Park, KS (US)

(72) Inventors: Jimmy R. Bainter, Gravois Mills, MO (US); Michael L. Eckstein, New Orleans, LA (US); Lawrence E. Guerra, Mission, KS (US); William R. Hendricks, Olathe, KS (US); Steven R. Walton, Overland Park, KS (US); Joshua H. Huisenga, Overland Park, KS (US)

( * ) Notice: Subject to any disclaimer, the term of this patent is extended or adjusted under 35 U.S.C. 154(b) by 85 days.

(21) Appl. No.: 16/537,370

(22) Filed: Aug. 9, 2019

(65) Prior Publication Data

US 2021/0339836 A1 Nov. 4, 2021

(51) Int. Cl.

*B63C 9/19* (2006.01)
*B60C 29/00* (2006.01)
*B63C 9/00* (2006.01)

(52) U.S. Cl.

CPC .................. *B63C 9/19* (2013.01); *B63C 9/24* (2013.01); *B63C 2009/007* (2013.01); *B63C 2009/0029* (2013.01); *F17C 2205/032* (2013.01); *F17C 2205/0302* (2013.01); *F17C 2205/0326* (2013.01)

(58) Field of Classification Search

CPC ..... B63C 9/19; B63C 9/24; B63C 2009/0029; B63C 2009/007; F17C 2205/0302; F17C 2205/0326; F17C 2205/032

USPC .................................... 441/90, 92, 93; 222/5

See application file for complete search history.

(56) References Cited

U.S. PATENT DOCUMENTS 4,475,664 A * 10/1984 Mackal ..................... B63C 9/24 441/95
4,498,604 A * 2/1985 Mackal ..................... B63C 9/24 441/95
4,498,605 A * 2/1985 Mackal ..................... B63C 9/24 441/95
5,509,576 A 4/1996 Weinheimer
6,123,227 A 9/2000 Umeda
7,011,232 B2 * 3/2006 Colombo .............. B60R 21/268 222/5
2012/0073677 A1 3/2012 Clark
2012/0217263 A1 8/2012 Becnel
2015/0360759 A1 12/2015 Ashard
2017/0029081 A1 2/2017 Michalski

OTHER PUBLICATIONS

US 5,685,544 A, 11/1997, Glasa (withdrawn)

* cited by examiner

*Primary Examiner* — Daniel V Venne

(57) ABSTRACT

The present invention relates to improved personal flotation devices and their methods of use. Advantageously, the devices and methods of the invention eliminate the need for a pyrotechnical firing mechanism, and compared to current devices, are less apt to be spontaneously activated by deterioration that is caused by storage in a humid environment or the passage of time. Instead, the devices and methods of use of the present invention incorporate electronic circuitry to activate automatic operation.

21 Claims, 9 Drawing Sheets

AUTOMATION OF FLOTATION DEVICES

BACKGROUND OF THE INVENTION

A. Field of the Invention

The present invention relates to improved flotation devices and their methods of use.

B. Description of the Related Art

Personal flotation devices (PFDs), commonly known as life jackets, may or may not be inflatable. Inflatable PFDs rely on inflatable chambers that provide buoyancy when inflated. In the un-inflated state they are less bulky. A number of different types of inflatable PFDs are available.

Inflatable PFDs can be inflated by manually blowing air into an inflatable bladder or by various mechanical or automatic means. For example, PFDs can be manually activated to inflate by the user pulling on a toggle or handle. The toggle or handle is part of a lever system that, when activated, pierces a cylinder to release gas (e.g. carbon dioxide) into an inflatable bladder. Automatic mechanisms do not require activation by a user to operate and cause inflation.

A number of automatic, activation mechanisms have been used to inflate lifejackets. Most automatic mechanisms are intended to activate when water is detected. Upon detecting water, a firing mechanism is activated to pierce a gas cylinder and cause the release of gas into an inflatable bladder of the PFD. Usually, these firing mechanisms are triggered pyrotechnically.

How water is detected varies with the type of operating or inflating mechanism that is used. For example, when an inflation mechanism is submerged in water, the mechanism can detect the presence of water and activate a fill mechanism to inflate a buoyant bladder.

Alternatively, an automatic system can activate when a cartridge mechanism comes into contact with water. The cartridge mechanism can be a compressed, high-powered spring that is held in place by a paper element (e.g. a disc or diaphragm), salt bobbin (i.e. a pill), or other soluble material. When the soluble material comes into contact with water it dissolves, and a spring is released. The spring pushes a plunger forward, which in turn, either pierces or causes another element to perforate a cylinder to release a gas. The gas travels through an aperture in an inflator head to inflate a lifejacket.

SUMMARY OF THE INVENTION

The present invention provides improved devices and methods relating to the automatic inflation of flotation devices. Advantageously, the invention utilizes triggering mechanisms that do not rely on either pyrotechnical detonation or soluble components to initiate inflation. Instead, the devices and methods of the present invention utilize electrical circuitry to trigger inflation. Compared to current technologies on the market, the devices encompassing the invention have fewer safety risks and are less likely to spontaneously trigger inflation during storage due to deterioration caused by humidity or the passage of time.

Automated inflation devices of the invention comprise (a) a housing with a cover; (b) an external manual release that is connected to a manual release cam inside the housing; (c) a trigger mechanism that has a circuit board that is connected to a battery and at least one sensor; (d) an automatic release mechanism that has (i) a plunger arm, (ii) a plunger arm stop, and (iii) a plunger arm spring; and (e) a bore that includes at least one O-ring and a piercing pin capable of penetrating an aperture of a gas cylinder. In preferred embodiments, the manual release has a handle and a pull cord.

The housing further includes a first opening able to attach to a gas cylinder and second opening able to attach to a valve of a flotation apparatus. Both the housing and cover are joined together such that a watertight seal is achieved. Preferably, the housing and cover are comprised of an engineered resin such as a thermal plastic rubber (TPR), thermal plastic elastomer (TPE), combinations thereof, or other similar moldable plastics or resins. Alternatively, the housing and cover may be composed of other materials as long as the materials are waterproof.

Both the circuit board and the battery are enclosed within the housing. The sensor that is attached to the circuit board extends outside of the housing and is capable of detecting the presence of an aqueous medium (e.g. water). Preferably, two or more sensors are connected to the circuit board and extend outside of the housing.

Advantageously, both the plunger arm and plunger arm stop are constrained axially by the housing and cover. The plunger arm has a near end mounted on a first pivot pin, and the plunger arm stop has a near end mounted on a second pivot pin. Both the first pivot pin and the second pivot pin are held in place by the joined housing and cover.

The plunger arm spring has a first end engaged with the far end of the plunger arm and tension is applied by the plunger arm spring to the plunger arm to cause the plunger arm to rotate. But, when a device of the invention is inactive, the plunger arm stop is engaged with the far end of the plunger arm and prevents the plunger arm from rotating about the first pivot pin so that inflation of an attached flotation device does not occur.

In some embodiments, the bore also includes a collar.

Preferred embodiments of the invention also include a fusible link with a first affixing feature at a near end and a second affixing feature at a far end. More preferably, the fusible link includes at least one notch along its length, and a resistance wire is attached to or surrounds the notch of the fusible link. Most preferably, a resistance wire is attached to or surrounds each notch of the fusible link.

Other embodiments of the invention include an actuator spring, a bias spring, an actuator arm, and an actuator spring that is attached to the circuit board and the actuator arm.

When a device of the invention is inactive, the bias spring stabilizes the plunger and actuator, and the actuator arm interlocks with the plunger arm stop such that in inactive devices the plunger arm stop constrains the plunger arm from applying force to the plunger.

In some embodiments a distal end of the actuator arm sits within a groove of the plunger arm stop, and in inactive devices of the invention, the actuator arm holds the plunger arm stop immobile.

Preferably, the actuator spring is comprised of a memory wire. A variety of suitable memory wires are known.

The invention also provides methods of inflating a flotation apparatus. When a device of the invention is covered with or submerged in an aqueous medium (water) a sensor that extends from the interior of the device to its exterior signals the circuit board that an aqueous medium has been detected, which causes the circuit board to direct a current to be sent from the battery to either a resistance wire or an actuator.

If the current is sent to a resistance wire, then resistance wire becomes heated and the fusible link that is associated with the resistance wire is stretched, broken, or melted and the actuator arm is released. Alternatively, if the current is sent to an actuator, then the actuator is stretched or broken, and the actuator is allowed to apply force directly to the actuator arm.

When the actuator arm is released it rotates, preferably counterclockwise, to release the plunger arm stop which causes the plunger arm to rotate about its pivot pin, preferably counterclockwise, such that the plunger is released within the bore (or cylinder plunger assembly). The released plunger pierces an aperture of a gas cylinder that is attached to the automated inflation device. Piercing the aperture allows gas (air) to be released from the gas cylinder through a first opening of the housing that is attached to the gas cylinder. The gas travels through this first opening then through a second opening in the housing to flow through a valve of a flotation apparatus that is attached to a device of the invention. The gas flow through the valve and inflates a flotation bladder of the flotation apparatus.

Advantageously, the housing and cover of a device of the invention axially constrain the plunger arm and plunger arm stop to limit their rotation about their associated pivot pins. It will be appreciated that in the alternative either or both the actuator arm and the plunger arm can be rotated clockwise during operation. Further, it is contemplated that, while rotation is preferred, either or both the actuator arm and plunger arm can be configured to move back and forth, side to side, or up and down and still function as intended.

Prior to activation, devices of the invention are maintained in an inactive state. The circuitry is kept in a low energy use state, and the mechanical elements are prevented from activating. Upon exposure of an external sensor to an aqueous medium such as water, the external sensor signals the circuit board of the presence of the aqueous medium. The circuit directs a current to be sent from the battery to the actuator, which activates the actuator. The actuator applies a force to the actuator arm; the actuator arm rotates counterclockwise to release the plunger arm stop; and the plunger arm rotates the plunger arm stop about its pivot pin counterclockwise such that the plunger is released. The plunger pierces an aperture of a gas cylinder that is attached to the automated inflation device such that gas is released from the gas cylinder through a first opening in the housing to which the cylinder is attached. Gas is released from the cylinder through the first opening in the housing and flow through a second opening in the housing. The second opening is attached to a fill valve of a flotation apparatus such that a flotation bladder of the flotation apparatus is inflated.

Advantageously, the likelihood of an unwanted triggering of a flotation device due to high humidity is reduced by the invention because the invention further includes a testing feature (or testing means). The testing feature (testing means) is rapid and prevents an activation signal from being sent by the circuit board due to a false positive reading by a sensor. More specifically, the testing means includes powering up an optical sensor receiver to determine if infrared light is detected; powering up a heat wire sensor circuit and heat wire circuit driver to verify that the resistance wire is intact; and using a battery voltage measurement circuit and circuit enable driver to measure battery voltage.

Those of skill in the art will appreciate that the testing feature can be accomplished by a multitude of programming instructions. It is only necessary that the testing prevents activation in the absence of the device being immersed in an aqueous solution and allows the rapid inflation of a flotation apparatus in the presence of an aqueous environment.

The present invention also includes methods of making an automated inflation device. Such methods comprise (a) making a housing with a cover, wherein the housing and cover are joined to each other with a watertight seal, and the housing has a first opening able to attach to a gas cylinder and second opening able to attach to a valve of a flotation apparatus; (b) attaching a manual release having a handle and a pull cord, wherein the manual release is connected to a manual release cam inside the housing; (c) installing a trigger mechanism having a circuit board that is connected to a battery and at least one sensor, wherein the circuit board and the battery are enclosed within the housing, and the sensor is capable of detecting the presence of an aqueous medium outside of the housing; (d) installing an automatic release mechanism having (i) a plunger arm that has a near end mounted on a first pivot pin and is constrained axially by the housing and cover, (ii) a plunger arm stop that has a near end mounted on a second pivot pin and is constrained axially by the housing and cover, and (iii) a plunger arm spring that has a first end engaged with the far end of the plunger arm and tension is applied to the plunger arm, wherein the plunger arm stop is engaged with the far end of the plunger arm and prevents an inactive plunger arm from rotating about the first pivot pin; and attaching a bore having at least one O-ring and a piercing pin capable of penetrating an aperture of a gas cylinder.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description presented herein.

DETAILED DESCRIPTION

Figure 1:
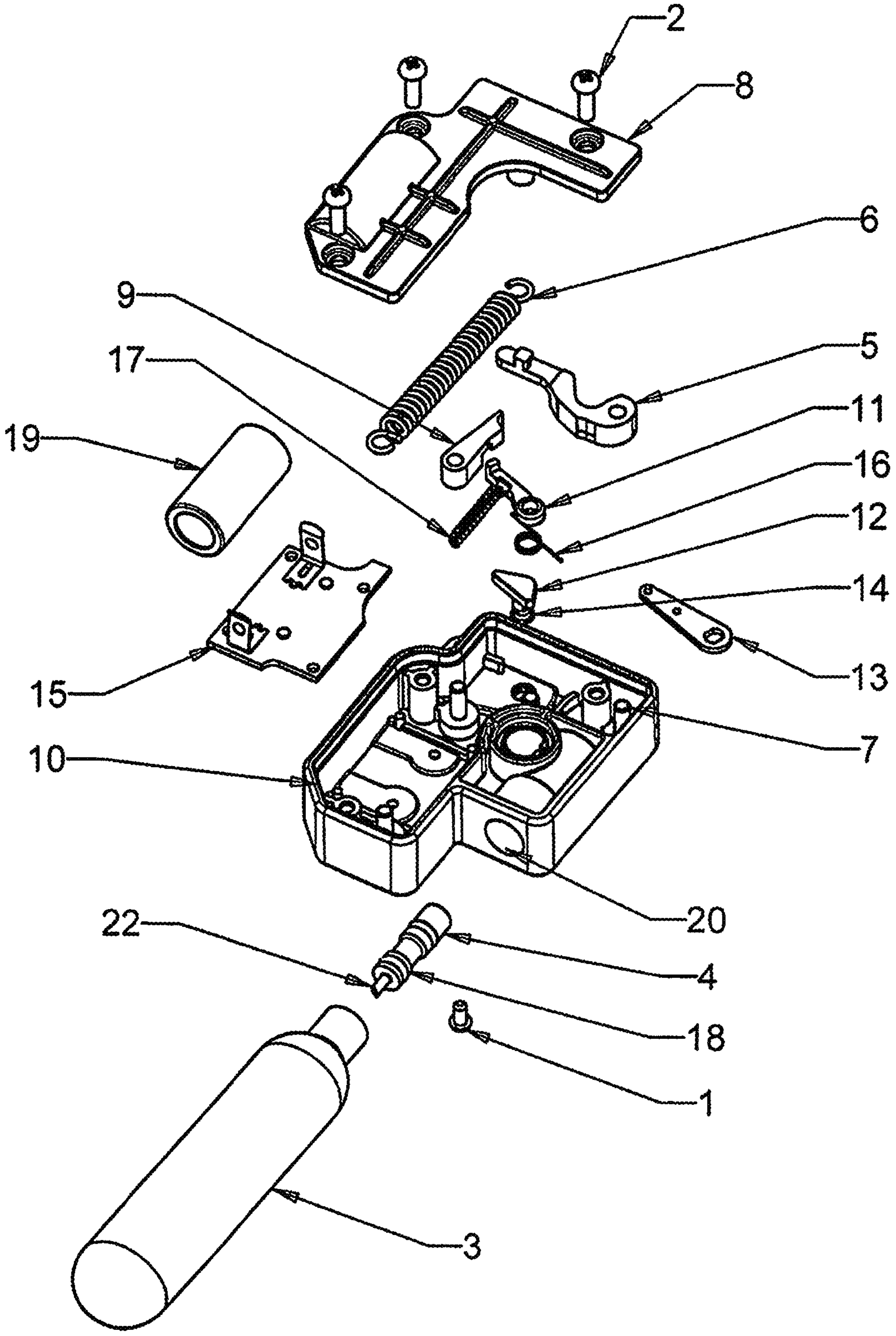
FIG. 1 is an exploded view of an exemplary embodiment of the invention as viewed from the back.
Figure 2:
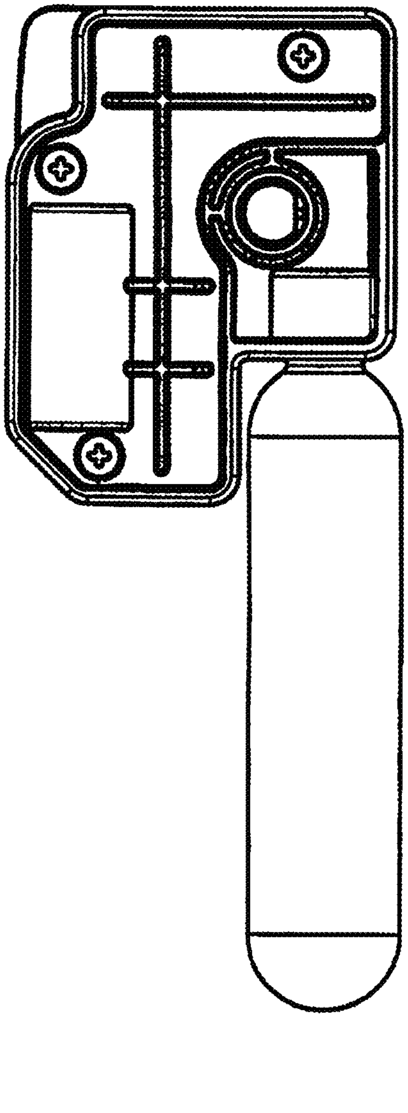
FIG. 2 shows an external back view of the assembled embodiment of FIG. 1.
Figure 3:
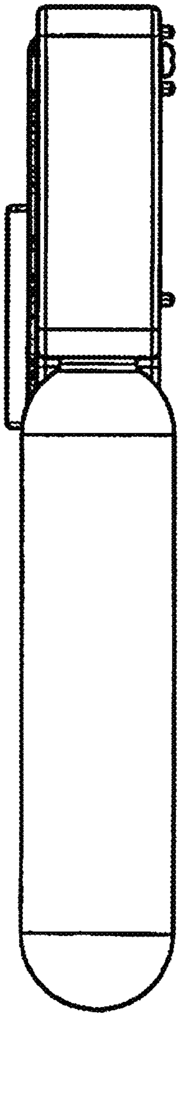
FIG. 3 shows an external side view of the assembled embodiment of FIG. 1.
Figure 4:
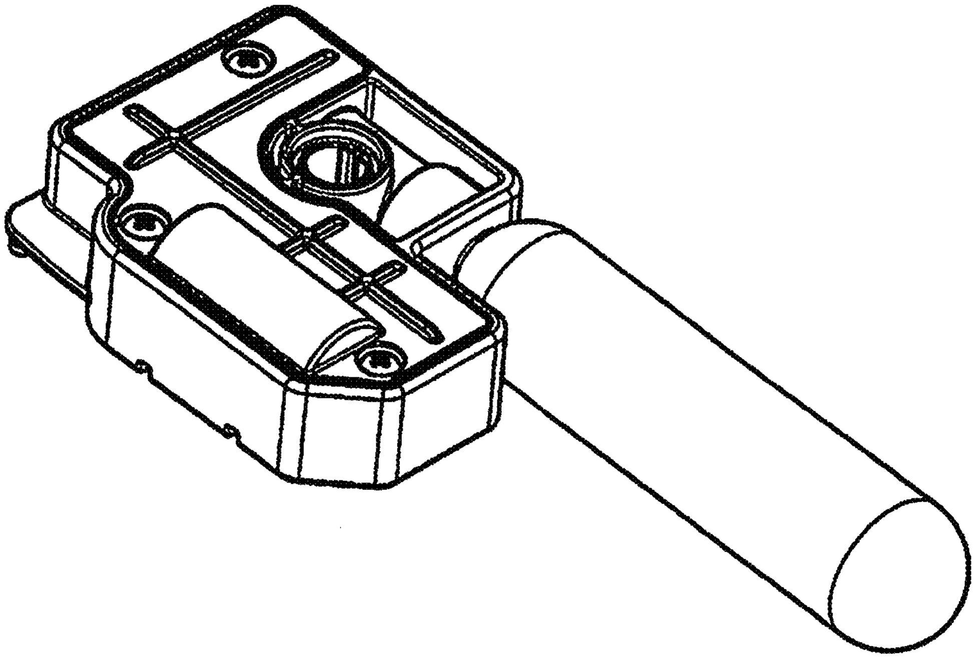
FIG. 4 shows a perspective view of the assembled embodiment of FIG. 1 from the back.

The invention provides improved devices and methods for the automatic inflation of flotation apparatuses. Devices of the invention comprise a combination of parts that work together to initiate the inflation of a flotation apparatus when it is submersed in water or other aqueous medium. Unlike conventional technology, the invention utilizes a trigger mechanism that incorporates electrical circuitry with a piercing component to initiate inflation. By using this type of triggering mechanism, devices that incorporate the invention are less likely to activate unintentionally due to long storage or humid conditions. Further, the invention provides a method of checking the readiness of a flotation apparatus without actually activating the device.

The trigger mechanism and piercing component are enclosed within and extend from a housing 10 attached to a cover 8. The housing 10 and cover 8 can be attached to each other by screws 2. See FIGS. 1 and 14. A wide variety of screws that are made from a variety of materials may be used. Preferred screws, such as Phillips head screws, are made of steel. Both the cover 8 and the housing 10 are molded such that the screws 2 can attach the cover 8 to the housing 10 and the external areas of the cover 8 around the screws 2 can be sealed.

More preferably, press-fit fastenings, other fastening devices such as snaps or tabs, or a combination thereof can be substituted for some or all of the screws 2 that are used to attach the housing 10 and cover 8 to each other. Those of skill in the art will recognize that a variety of suitable press-fit fastenings exist, and press-fit fastenings can be separate or integral to the parts that they connect. In preferred embodiments, the press-fit fastenings are integral to the housing 10 and cover 8.

A bead of adhesive or sealant is applied to the joined edges of the housing 10 and cover 8, as well as around any screws 2 joining the housing 10 and cover 8, to ensure a water-tight seal. Those of skill in the art will be understand that a wide variety of suitable waterproof adhesives and sealants are available and can be used with devices of the invention.

The housing 10 and cover 8 may be composed of a variety of suitable materials such as aluminum, metal, aluminum alloys, metal alloys, plastics, rubbers, or combinations thereof. Preferably, the housing 10 and cover 8 are comprised of an engineered resin. For example, the engineered resin can be a sealing material such as thermal plastic rubber (TPR) or thermal plastic elastomer (TPE) that can be over molded to form and seal the exteriors of the cover and housing. Preferred engineered resins include injection-molded plastics such as TPR, TPE, or a combination thereof. Both the housing and cover are impermeable to water.

The trigger mechanism of the invention comprises a printed circuit board (circuit board) 15 that is attached to a battery 19 and at least one, more preferably two, external sensors 30. See FIGS. 6 and 11. The position(s) of the external sensor(s) may vary as long as the sensor(s) is able to function as intended when a device is submersed in water or another liquid. Preferably, one end (a first end) of a sensor(s) 30 comprises a gold plated contact(s) that is attached (usually soldered) to the printed circuit board 15 and the other end (a second end) of the sensor 30 protrudes through the housing 10 to the exterior environment so that the sensor 30 can detect an aqueous medium (water). The area of the housing 10 through which a sensor 30 protrudes is sealed. For example, a TPR or TPE can be over-molded onto the exterior of the housing and form a seal around the end of the sensor 30 that protrudes through the housing. See FIG. 11. Alternatively or additionally, a bead of sealant may be used to create a watertight seal.

In a preferred embodiment, the sensors 30 are screws that attach the circuit board 15 to the housing 10 and have a conductive strip around their corresponding screw holes in the housing 10 so that sensor information can be transmitted to or from the circuit board 15. See FIGS. 6 and 11.

Those of skill in the art will appreciate that the circuit board illustrated in the accompanying figures is only a representation that shows the relative position of the circuit board within the invention and is not intended to show the details of a circuit board. Those of skill in the art will be familiar with circuit board designs. It is expected that a wide variety of printed circuit boards and microprocessors may be used in the invention, as along as the selected circuit board or microprocessor is able to function as described herein and illustrated in the block diagram shown in FIG. 15.

Figure 6:
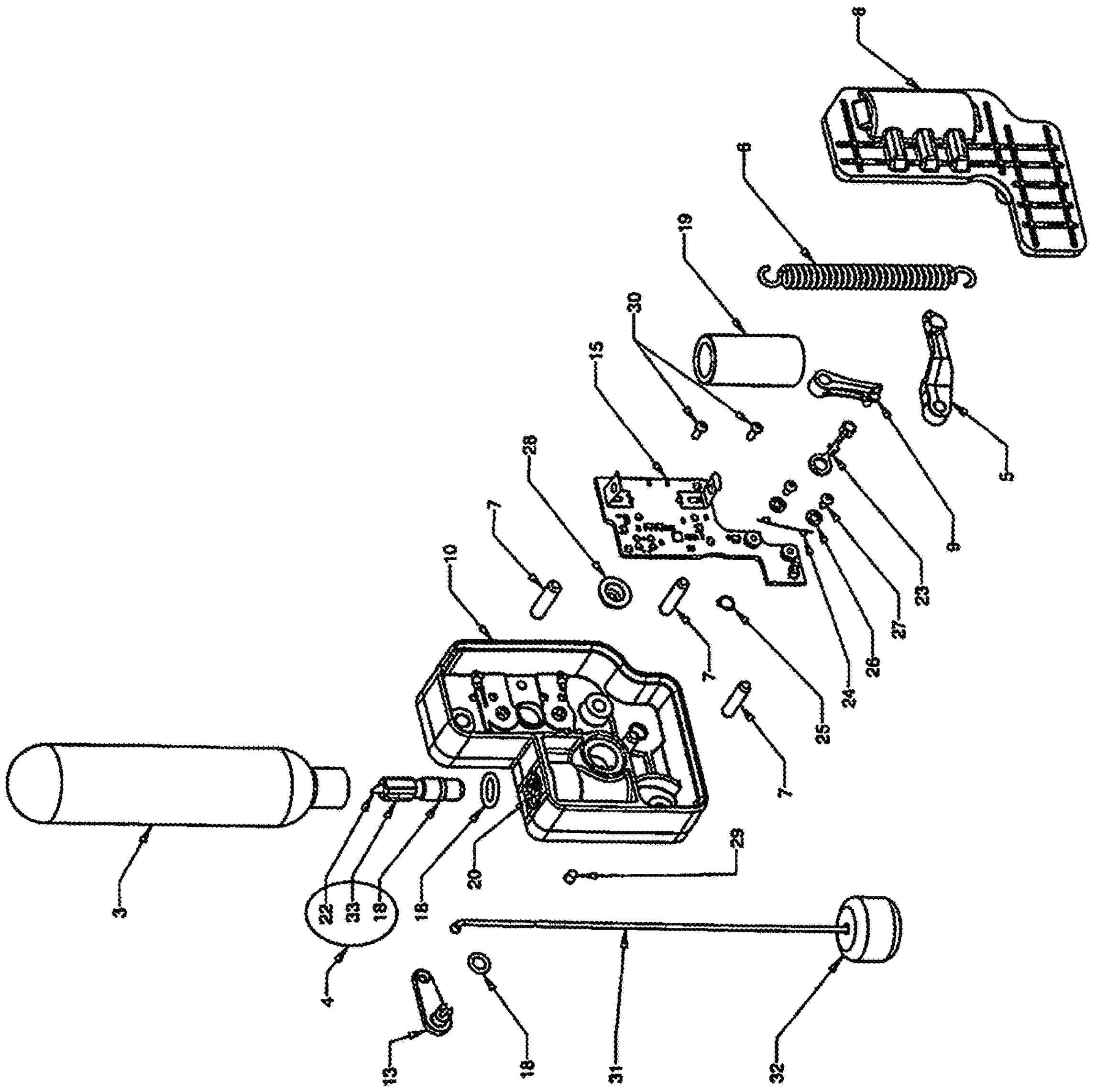
FIG. 6 is an exploded view of another embodiment as viewed from the back.
Figure 7:
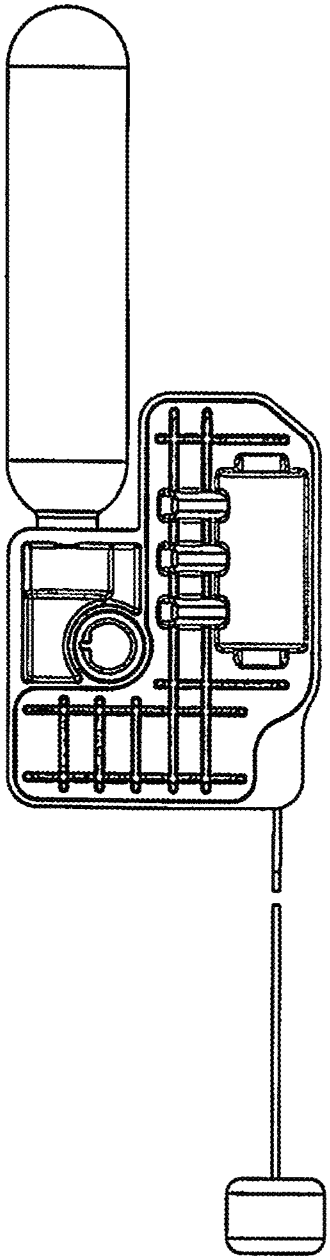
FIG. 7 shows an external back view of the assembled embodiment of FIG. 6 with a breakline in the pull cord.
Figure 8:
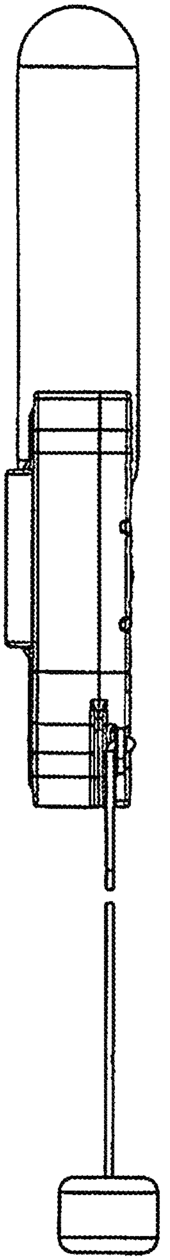
FIG. 8 shows an external side view of the assembled embodiment of FIG. 6 with a breakline in the pull cord.
Figure 9:
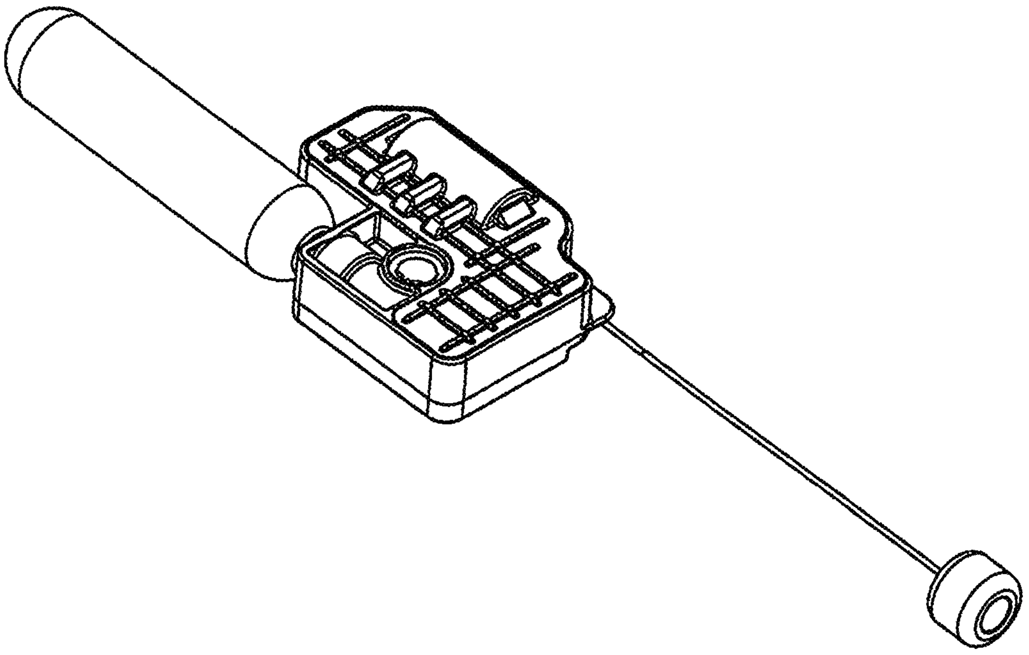
FIG. 9 shows a perspective back view of the assembled embodiment of FIG. 6 attached to a gas cylinder.

While the printed circuit board can be placed in a variety of locations within a device, it is preferred that the printed circuit board 15 is located on the floor of the housing 10 (relative to the device as shown in FIG. 1 or 6) for easier manufacture and better stability. The printed circuit board 15 can be attached to the housing 10 in any suitable manner known in the art. For example, fasteners, such as screws, may be used. Alternatively, the circuit board can be attached to the housing by heat stake posts. The battery 19 is held in place through contacts that are soldered into place on the circuit board 15. Those of skill in the art will be familiar with appropriate attachment techniques for batteries. A variety of batteries may be used in devices of the invention. Preferred batteries are lithium polymer batteries such as the Duracell® CR123 or similar batteries that are designed for high power devices.

Figure 15:
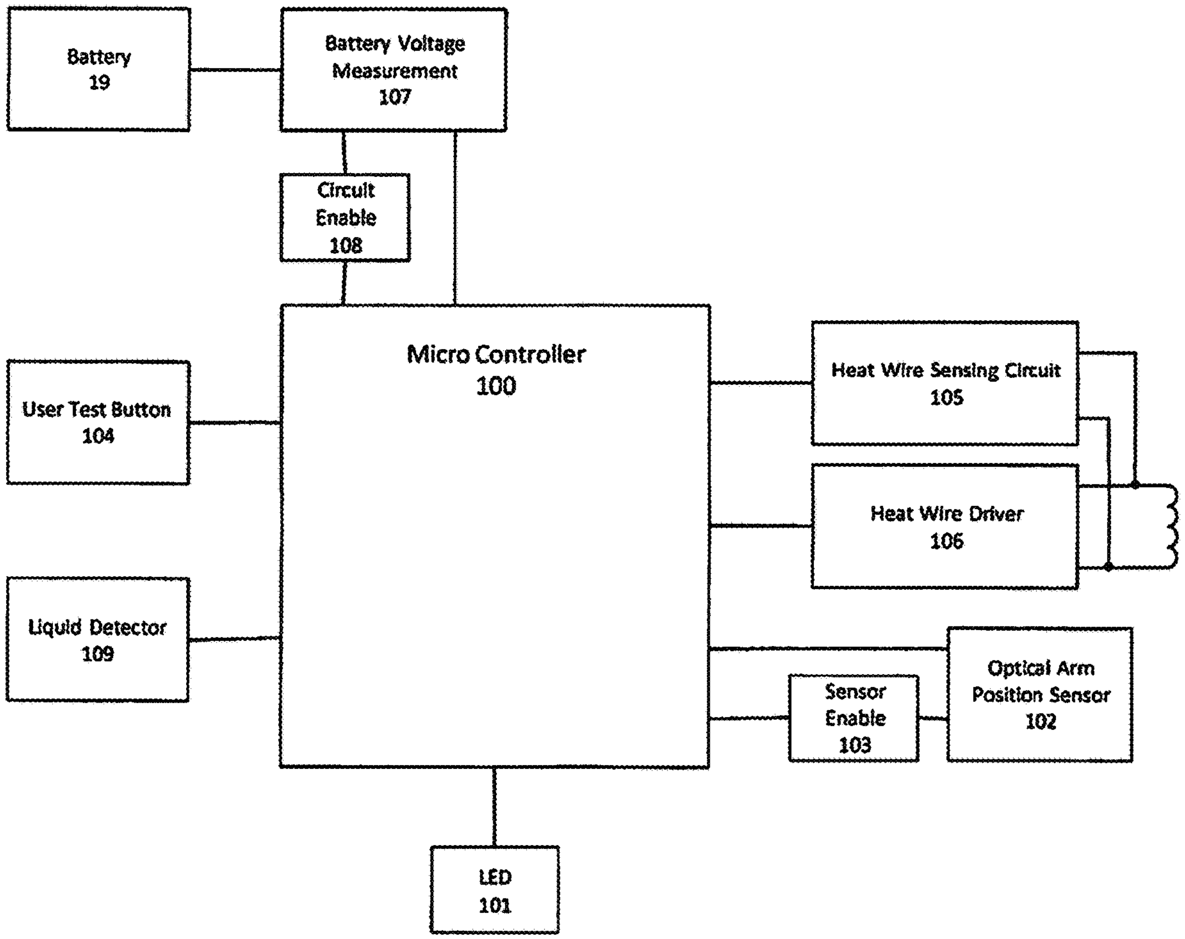
FIG. 15 is a block diagram of the processor circuitry and its relationships with the sensors.

As illustrated in FIG. 15, the circuit board 15 includes a microcontroller 100. Once a battery 19 is installed, the microcontroller 100 is always powered on (i.e. powered up, turned on), but to conserve battery life, the microcontroller 100 is usually in a deep sleep mode that uses little power. The microcontroller 100 is removed from its sleep mode either by testing the apparatus or detecting a liquid.

When the battery 19 is installed, the software initializes the processor hardware, and then quickly turns on a light emitting diode (LED) 101 that is located on the circuit board 15. Preferably, the LED 101 is capable of emitting at least two colors such as red and green. The software (program) causes the LED 101 to flash a number of times, preferably in alternating colors, that corresponds to the software revision that is installed. For example, if a third revision of the software is installed, then the LED 101 would flash green/red three times. The microcontroller 100 (e.g. a ATtiny416 processor) is then placed into a deep sleep mode. Light emitted by the LED 101 is visible to a user through a light pipe (channel) 29 that is located in the housing 10. See FIG. 11.

To awaken the microcontroller 100 from deep sleep, a user can test the system by pressing an actuator (actuator button, test button) 28. The actuator 28 in FIG. 11 corresponds to the test button 104 illustrated in the block diagram of FIG. 15. When the actuator 28 (test button 104) is pressed, a signal is sent to the microcontroller 100 to awaken and perform the self-test described below. If the self-test fails at any step, then the test stops and any remaining steps are not performed.

First, the microprocessor 100 powers up the optical sensor receiver (also referred to as an optical arm position sensor or optical sensor) 102 to take a reading to determine if it can detect infrared light through the light pipe (channel) 29. If the optical sensor receiver 102 detects infrared light then the mechanism is not in the armed position, the test fails, and the LED 101 is turned on (e.g. red light is emitted) for at least 3 seconds. Alternatively, if the sensor receiver 102 does not detect infrared light then the mechanism is in the armed position, and the test continues.

Next, the heat wire test circuitry that comprises a heat wire sensor circuit 105 and a heat wire circuit driver 106 is enabled to verify that the resistance wire (heat wire) 24 is intact. If this test fails, the LED 101 flashes (e.g. red light is emitted) on and off three times. The heat wire test circuitry is disabled after the test is completed. (In alternative embodiments described below that use an actuator spring, the heat wire test circuitry can be programmed to test whether the actuator spring is in a ready position using a similar methodology.)

Finally, the battery voltage circuit, which comprises a battery voltage measurement circuit 107 and circuit enable driver 108, is enabled, and the battery voltage is measured. A battery voltage measurement that is below 2.6V fails the test, and the LED 101 flashes (e.g. red light is emitted) three times. The battery test circuitry is disabled after the test is completed.

Those of skill in the art will appreciate that the order of these tests can be altered. Herein, the tests are described in the manner that has been found to work well in the invention.

If any of the tests fail, a user can press the actuator 28 (i.e. test button 104) for at least 6 seconds, and diagnostic data will be displayed. For example, if the battery voltage test failed, the LED 101 will flash a green light three times. If the user continues to hold down the actuator 28 for at least an additional 8 seconds, then the circuit board will reset and cause the LED 101 to flash, preferably in alternating colors, the number of times that corresponds to the software revision that is installed.

If all three tests are passed, then the LED 101 will emit a signal, such as a green light, for a minimum of about 3 seconds or until the user releases the actuator 28 (test button 104). If the user holds down the actuator 28 for at least 11 seconds when all tests have been passed, then the circuit board 15 will reset and the software revision will be shown by flashing the LED 101 in alternating colors as previously described.

If the sensors 30 are in the presence of a liquid then an electrical circuit is completed, and a signal is sent to the liquid sensing circuit (liquid sensor) 109, which causes the microprocessor (processor) 100 to awaken from sleep. To avoid a false positive that liquid is present such as may occur in very humid conditions, the microprocessor 100 monitors the detector output from the liquid sensing circuit 109 about 1000 times/second for about 1.25 seconds. If the liquid sensor 109 does not detect liquid within the monitoring period, then the processor 100 returns to its sleep mode. In other words, liquid must be present consistently for about 1.25 seconds for automatic inflation to be triggered.

If the presence of liquid is confirmed, then the processor 100 activates both the LED 101 and the heat wire circuitry (heat wire sensor circuit 105 and heat wire circuit driver 106). When activated the LED 101 emits a signal (e.g. green light) to indicate activation, and the heat wire circuitry sends a signal to the resistance wire (heat wire, heater wire) 24 for about 2-5 seconds that causes the resistance wire 24 to become heated. The microprocessor 100 then monitors the liquid sensor 109 until liquid is no longer detected before returning to sleep mode.

Alternatively, if the device includes an actuator spring 17 rather than a resistance wire, the processor 100 sends a current to the actuator spring 17 rather than the resistance wire 24 for about 2-5 seconds to cause the actuator spring 17 to contract and apply force to the actuator arm 11.

Activation occurs when a device of the invention is submerged in an aqueous medium (water), and the sensor(s) 30 on the housing 10 detects the presence of the aqueous medium. During activation, an electrical pathway between the external sensor(s) 30 and the printed circuit board 15 is formed and inflation of the flotation device is triggered. Those of skill in the art will recognize that theoretically a variety of mechanical designs may be used to accomplish inflation of a flotation device. But, because flotation devices are often stored for long periods in environments with high humidity and variable temperatures and when used flotation devices are often subject to considerable impact or other forces, successful designs must be able to withstand harsh storage conditions and extraneous impacts and still function quickly. Herein, are provided designs that contemplate such conditions.

Figure 5:
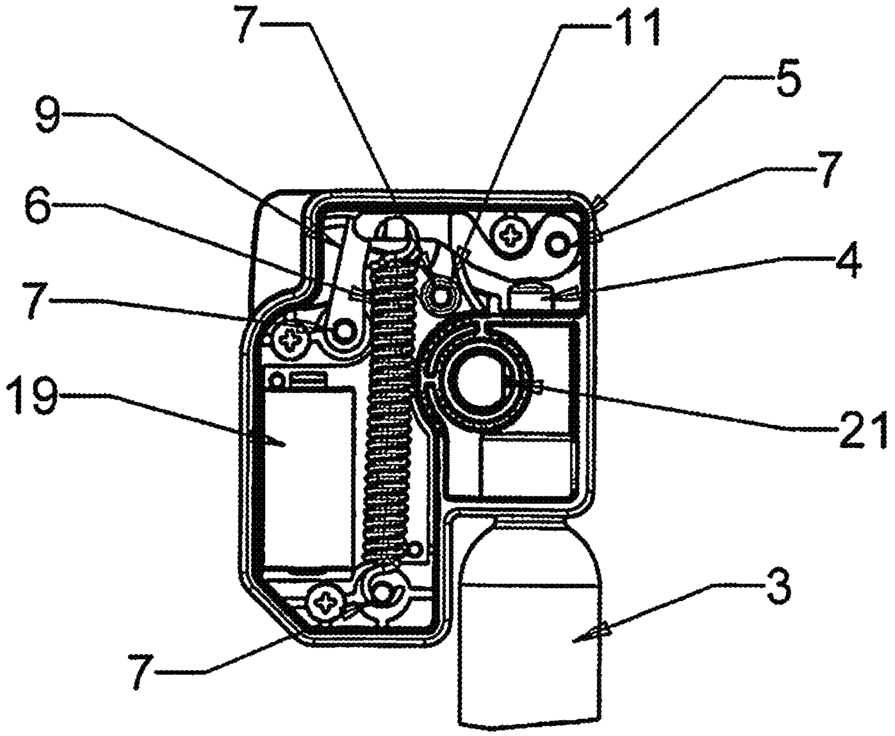
FIG. 5 shows an internal back view of the assembled embodiment of FIG. 1.

In one embodiment, the completed electrical pathway causes the printed circuit board 15 to send current from a battery 19 that is attached to the printed circuit board 15 to an actuator spring 17. See FIGS. 1 and 5. In another embodiment, the completed electrical pathway causes the printed circuit board 15 to send current from a battery 19 to a resistance wire 24. See FIGS. 6 and 10.

In embodiments with an actuator spring, devices include actuator arm (trigger arm) 11, a bias spring 16, an actuator spring (bias spring) 17, and an interior manual release lever 12. See FIGS. 1 and 5. Embodiments with an actuator spring do not include a resistance wire or fusible link. See FIGS. 1 and 5. In embodiments that include a resistance wire rather than an actuator spring, devices include a resistance wire (resistance wire coil) 24 and a fusible link 23. Embodiments with a resistance wire do not include a bias spring, actuator spring, actuator arm, or interior manual release. See FIGS. 6, 10, 11, and 14.

All embodiments of the invention include a plunger arm 5, plunger arm spring 6, plunger arm stop 9, and a cylindrical plunger assembly (a.k.a. piercing pin assembly, bore, or plunger) 4. The plunger assembly 4 has a body with a piercing pin (piercing end) 22 and one or more O-rings 18 and is located with a first opening (a cylindrical opening) 20 of the housing 10. The cylindrical plunger assembly 4 may be held in place by a fastener 1. In an alternative configuration, the plunger assembly 4 includes a collar 33 that is held in place within the first opening 20 of the housing 10 by friction, adhesive, or a combination thereof. See FIG. 6.

The collar 33 assists in securing an airtight seal and may be used in place of, or in addition to, either the fastener 1 or one or more O-rings 18.

Figure 10:
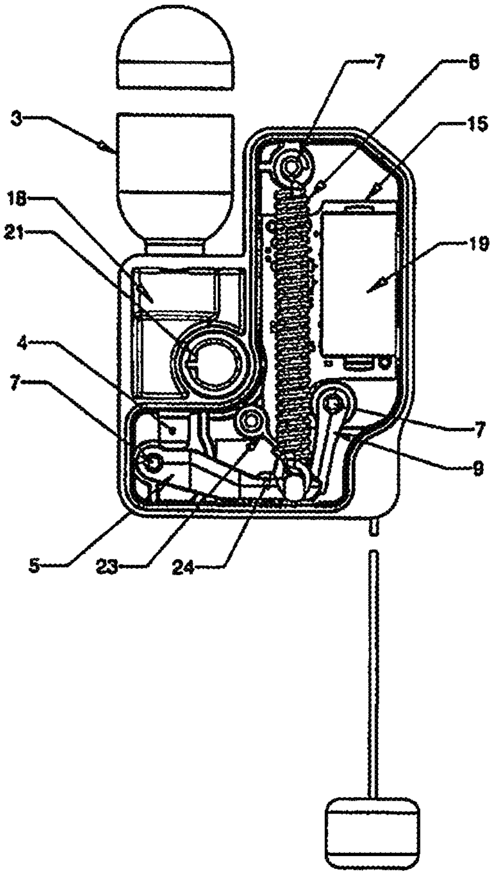
FIG. 10 shows an internal front view of the assembled embodiment of FIG. 6 with a breakline in the gas cylinder.
Figure 11:
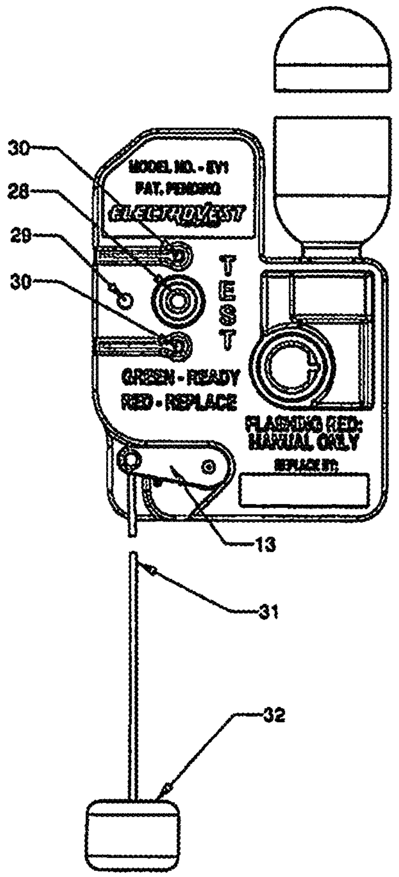
FIG. 11 shows a front view of the assembled embodiment of FIG. 6 with a breakline in the gas cylinder.

When the device is in the active state, air is directed from a gas cylinder 3 through the first opening 20 and second opening 21 of the housing 10 to an inflatable bladder of a flotation apparatus. Those of skill in the art will be aware that PFDs that work with an inflation device include a stud or valve that is molded into the PFD and to which the inflation device is attached. Here, opening 21 attaches to this stud or valve of the PFD. A nut or cap that attaches to the stud or valve encloses the stud or valve after it is attached to an inflation device of the invention so that gas (air) that is released from the gas cylinder 3 flows through the valve and into the PFD. After being attached, the stud (valve) and nut (cap) are sealed within the device. As illustrated in FIGS. 10 and 11, opening 21 can be keyed with a D-shape to fit the stud (valve) of a particular type of PFD. Skilled artisans will appreciate that opening 21 can be reshaped to a specific type of PFD to which devices of the invention are to be attached.

To facilitate gas flow from the cylinder 3, an interior groove around the opening 21 may be included in the configuration of the bore 4. If an interior groove is present then it extends from the opening 21 in the housing for the fill valve to the opening 20 in the housing through which the plunger 4 moves towards the aperture of a gas cylinder 3 (see FIGS. 1 and 5). The plunger (plunger assembly, bore) 4 includes a piercing end 22 that can penetrate the aperture of an attached gas cylinder 3 so that gas can escape from the gas cylinder 3.

Those of skill in the art will appreciate that the physical configuration and overall shape and size of the plunger assembly 4, as well as the parts that form the piercing mechanism, can vary depending upon, among other factors, the size and type of gas cylinder to be pierced, the type of flotation apparatus to be inflated, the force(s) that is to be exerted for inflation, and the material(s) from which the components are made. For example, the number and size of O-rings that are present depends, in part, upon the physical shape and size of the opening of a gas cylinder (e.g. a carbon dioxide ($CO_2$) tank) that is to be pierced by the plunger. Further, as long as the plunger is capable of piercing the gas cylinder such that gas is released from the cylinder as intended, the piercing end of the plunger may be pointed or blunt.

When in the inactive state, the plunger (piercer or piercing pin) 4 is located within the first opening 20 and in line with the gas cylinder's aperture that is to be pierced, but the plunger 4 is not in direct contact with the gas cylinder 3.

Prior to activation of an embodiment having an actuator spring 17, the piercing assembly 4 is held in an inactive ("ready") state by the interlocking of the device's parts. See FIG. 5. Specifically, the actuator arm 11 interlocks with the plunger arm stop 9 to prevent the plunger arm 5 from forcing the plunger (or piercer) 4 into the gas cylinder 3. A plunger arm spring (load spring) 6 and a bias spring 17 act to stabilize the plunger and actuator, respectively, against vibration in the inactive state. When current is sent to the actuator spring 17, it contracts and applies force to the actuator arm 11 to cause the actuator arm 11 to rotate counterclockwise and release the plunger arm stop (or blocking arm) 9.

Figure 12:
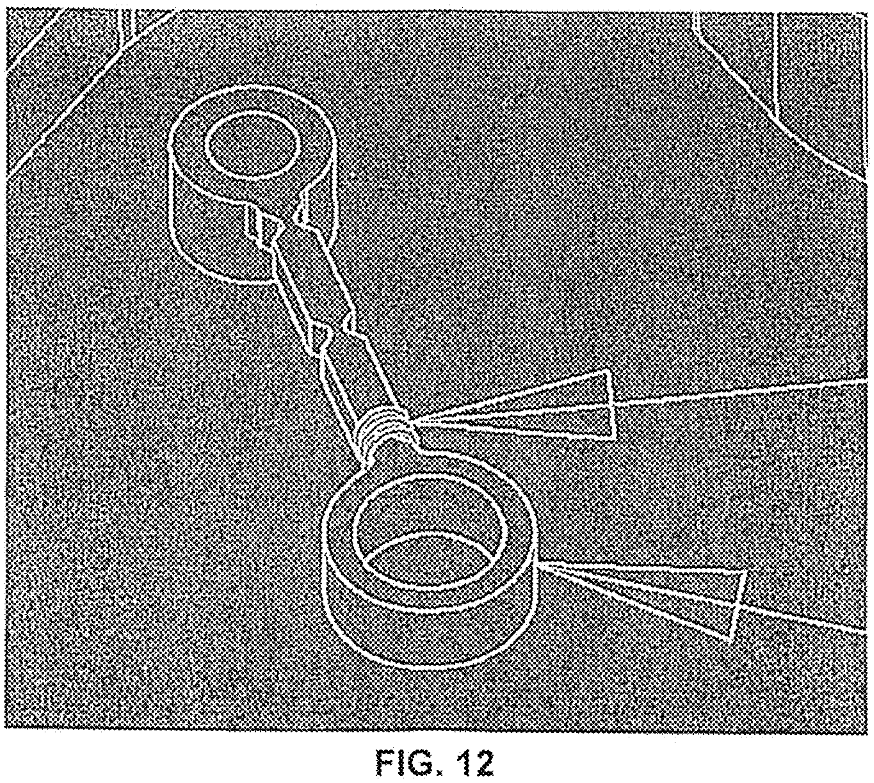
FIG. 12 illustrates an exemplary fusible link (part 23). Top arrow indicates a resistance wire (part 24). Bottom arrow indicates an affixing feature of the fusible link.
Figure 13:
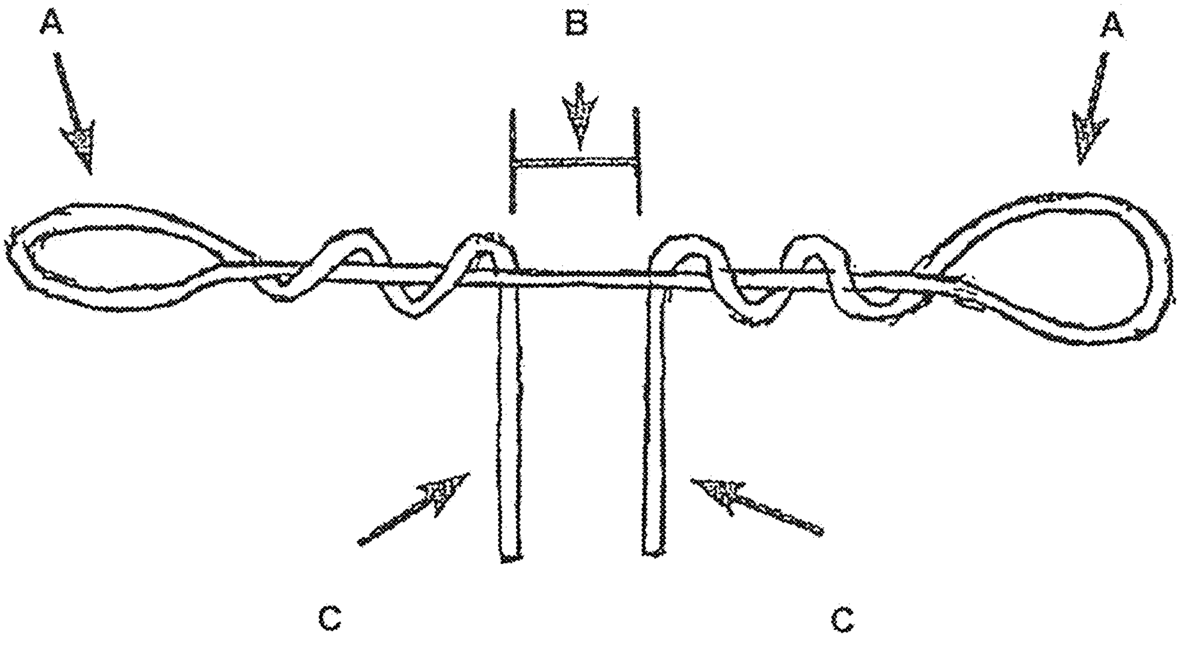
FIG. 13 illustrates a different exemplary fusible link. Arrows A indicate affixing loops; arrow B and H symbol indicate the conductive section of the fusible link; and arrows C indicate wire ends that connect to a power source (e.g. battery).

Prior to activation of an embodiment having a resistance wire, the resistance wire 24 is coiled around the fusible link 23 and held in place by a screw 27. See FIGS. 6 and 12. When current is sent to the resistance wire (or heat wire) 24, the resistance wire 24 is heated as current passes through it, and the fusible link 23 is melted, stretched, or broken such that the plunger arm stop (or blocking arm) 9 is released and able to rotate counterclockwise. In the alternative embodiment of a fusible link (see FIG. 13) the current is sent to the conductive section of the fusible link 23 as indicated by arrow B. The length of this conductive area determines the speed of the fuse. That is, the longer the section then the slower the fuse, and similarly, the shorter the section then the faster the fuse.

During the active state for all embodiments, the plunger arm stop 9 is potentially able to rotate freely on a pivot pin 7 to which it is mounted, but the plunger arm stop 9 is constrained axially by the housing 10 and cover 8. Similarly, in the active state the actuator arm 11 and plunger arm 5 are potentially able to rotate on the respective pivot pins 7 to which they are mounted, but they also are constrained axially by the housing 10 and cover 8. Preferably, the pivot pins 7 are made of corrosion resistant metal and located in bosses that are molded as part of the housing 10 and pressed into position.

When the plunger arm stop (or blocking arm) 9 is released from the ready position, it is rotated about its pivot pin 7 counterclockwise by the plunger arm (cam arm) 5, which is under tension from the load spring (or plunger arm spring) 6, so that the plunger (within a cylinder plunger assembly) 4 is released. The plunger arm (cam arm) 5, through tension from the load spring 6, pushes the piercing pin 22 of the released plunger (plunger assembly) 4 through a foil seal, or other seal, covering the aperture of a gas cylinder 3 that is attached to the device.

Once the aperture of the gas cylinder 3 is pierced, gas flows from the gas cylinder through an opening 21 in the housing 10 through a fill valve that is part of, or attached to, the flotation apparatus. Illustrations of exemplary devices of the invention attached to gas cylinders are provided in FIGS. 2-4 and 7-11.

Figure 14:
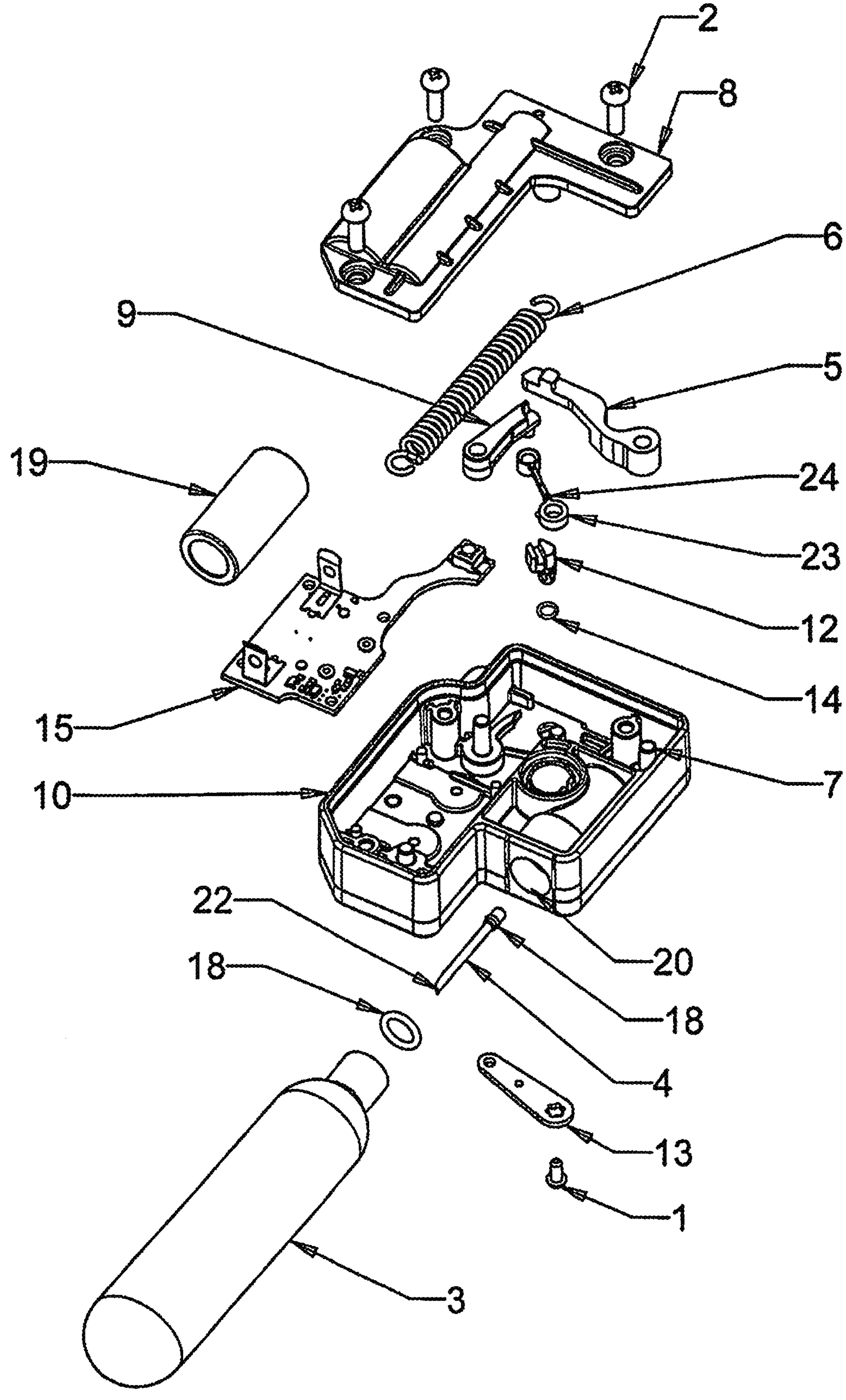
FIG. 14 shows an exploded view of another embodiment of the invention.

In the embodiments having an actuator spring, the distal end of the actuator arm 11 is shaped so that it sits within a groove in the underside of the plunger arm stop 9 so that the actuator arm 11 is able to hold the plunger arm stop 9 in place during the inactive or ready state. Similarly, the respective distal ends of the plunger arm stop 9 and plunger arm 5 are shaped so that the plunger arm 5 is held in place during the inactive or ready state. For example, the distal end of the plunger arm stop 9 can include a shoulder that contacts and interacts with the distal end of the plunger arm 5 so that the plunger arm 5 is held in the ready position. Those of skill in the art will appreciate that each of these parts can be formed into a variety of shapes and still function as described herein. Such an alternative shaping of these parts is illustrated in FIG. 14.

Embodiments that include a resistance wire also include a fusible link 23. Suitable fusible links include a (first) affixing feature at a near end and another (second) affixing feature at a far end of a link. See FIGS. 12 and 13. Those of skill in the art will appreciate that the shape of either affixing feature may be altered without changing the purpose of the feature. For example, affixing features may be cylindrical, slotted, polyhedron, etc. in overall shape. Alternatively, a fusible link may comprise a resistance wire that is bent or formed into a desired shape to create a fusible link. See FIG. 13. The selection of the shape of the affixing features will be determined at least in part by ease of manufacture and the shape of the space into which the fusible link is to be situated within a device.

A preferred fusible link 23 includes at least one notch somewhere along its length. See FIG. 12. More preferably, fusible links have at least two notches. Most preferably, a fusible link has three notches. It is not necessary that the notches be evenly spaced along the length of a fusible link. It is only necessary that the notche(s) facilitate the breaking, stretching, or melting, of the fusible link so that the blocking arm 9 is released when the device is activated.

A resistance wire coil 24 surrounds at least one notch of a fusible link 23. The resistance wire coil may be over-molded into the fusible link so that the fusible link 23 and resistance wire coil 24 can effectively be installed as a single piece during assembly.

In embodiments having an actuator spring, the actuator spring 17 that is attached to both the printed circuit board 15 and actuator arm 11 can be made of memory (i.e. muscle) wire. Those of skill in the art will be familiar with shape-memory alloys and their ability to change shape when heated such as by an electrical current. Either straight wire or coil spring wire may be used in the devices of the invention. The skilled artisan will also appreciate that different types of memory wire may be preferred in different embodiments of the invention. For example, one type of memory wire may be preferred to inflate a relatively small flotation apparatus, such as a personal life vest, and a different type of memory wire may be preferred to inflate a comparatively larger flotation apparatus, such as a boat or raft. The choice of memory wire will be influenced by a number of factors including the amount of force that is to be exerted and overall configuration of the device.

Alternatively, in place of the actuator spring, a small motor or solenoid may be used to exert force onto the actuator arm. Those of skill in the art will appreciate that the choice of whether to incorporate a resistance wire, memory wire, motor, or solenoid will be, in part, determined by space constraints within the device.

Additionally, devices of the invention include a manual operation mechanism. Specifically, devices include a manual release (outside manual release lever) 13 that is mounted onto a respective pivot pin 7. Preferably, the manual release 13 is attached to a manual pull cord 31 having a handle 32. The manual release 13 may be held in an inactive state by an internal manual release cam 12 that can be released by either pressing, pulling, or turning the manual release 13.

The opening in the housing through which the manual release 13 extends is sealed by an O-ring 14 or a sealant. Those of skill in the art will appreciate that the manual release and manual release cam can be formed into a variety of shapes and still function as intended. The manual release and manual release cam can be made of a variety of materials such as metals, plastics, or a combination thereof.

Manual inflation is activated by pulling the manual release (outside manual release lever) 13. If the internal manual release cam 12 is present, using the manual release lever 13 causes the manual release cam (inside manual release lever) 12 to rotate. In one embodiment, the inside manual release lever 12 pushes against the actuator arm (trigger arm) 11 to cause it to rotate counterclockwise and release the plunger arm stop (or blocking arm) 9. Alternatively, using the manual release lever 13 causes the fusible link 23 to twist and either break or stretch sufficiently to release the plunger arm stop (or blocking arm) 9.

As with automatic inflation, when the plunger arm stop (or blocking arm) 9 is released from the ready position, it is rotated about its pivot pin 7 counterclockwise by the plunger arm (or cam arm) 5, which is under tension from the load spring (or plunger arm spring) 6, so that the plunger 4 is released within the cylinder plunger assembly. The plunger arm (or cam arm) 5, through tension from the load spring 6, pushes the piercing pin 22 of the released plunger (plunger assembly) 4 through a foil seal, or other seal, covering the aperture of a gas cylinder 3 that is attached to the device.

Unless defined otherwise, all technical and scientific terms used herein have the same meaning as is commonly understood by one of skill in the art to which this invention belongs at the time of filing. The meaning and scope of terms should be clear; however, in the event of any latent ambiguity, definitions provided herein take precedent over any dictionary or extrinsic definition. Further, unless otherwise required by context, singular terms shall include pluralities and plural terms shall include the singular. Herein, the use of "or" means "and/or" unless stated otherwise. Furthermore, the use of the term "including", as well as other forms such as "includes" and "included" is not limiting.

Those of skill in the art should, in light of the present disclosure, appreciate that many changes can be made in the specific embodiments which are disclosed and still obtain a like or similar result without departing from the spirit and scope of the invention. Thus it should be understood that the terminology used herein is for the purpose of describing exemplary embodiments of the invention and is not intended to be limiting to only those embodiments to the exclusion of equivalent embodiments with which the skilled artisan would be familiar. All of the devices and methods disclosed and claimed herein can be made and executed without undue experimentation in light of the present disclosure.

What is claimed is:

1. An automated inflation device comprising a) a housing with a cover, wherein the housing and cover are joined to each other with a watertight seal, and the housing has a first opening able to attach to a gas cylinder and second opening able to attach to a valve of a flotation apparatus;

b) a manual release having a handle and a pull cord, wherein the manual release is connected to a manual release cam inside the housing;

c) a trigger mechanism having a circuit board that is connected to a battery and at least one sensor, wherein the circuit board and the battery are enclosed within the housing, and the at least one sensor is capable of detecting a presence of an aqueous medium outside of the housing;

d) an automatic release mechanism having i) a plunger arm that has a near end mounted on a first pivot pin and is constrained axially by the housing and cover, ii) a plunger arm stop that has a near end mounted on a second pivot pin and is constrained axially by the housing and cover, and iii) a plunger arm spring that has a first end engaged with a far end of the plunger arm and tension is applied to the plunger arm, wherein the plunger arm stop is engaged with the far end of the plunger arm and prevents an inactive plunger arm from rotating about the first pivot pin; and e) a bore having at least one O-ring and a piercing pin capable of penetrating an aperture of the gas cylinder.

2. The automated inflation device of claim 1, wherein the housing and cover are comprised of an engineered resin.

3. The automated inflation device of claim 1, wherein the bore includes a collar.

4. The automated inflation device of claim 1, wherein two or more sensors connect to the circuit board.

5. The automated inflation device of claim 1 further comprising a fusible link having a first affixing feature at a near end, a second affixing feature at a far end.

6. The automated inflation device of claim 5, wherein the fusible link has at least one notch along its length; and a resistance wire is attached to or surrounds the notch.

7. The automated inflation device of claim 1 further comprising an actuator spring, a bias spring, and an actuator arm, wherein in an inactive device the bias spring stabilizes the plunger and actuator and the actuator arm interlocks with the plunger arm stop such that the plunger arm stop constrains the inactive plunger arm from applying force to the plunger.

8. The automated inflation device of claim 7, wherein a distal end of the actuator arm sits within a groove of the plunger arm stop, and when in an inactive state, the actuator arm holds the plunger arm stop immobile.

9. The automated inflation device of claim 7, wherein the actuator spring is attached to the circuit board and the actuator arm.

10. The automated inflation device of claim 7, wherein the actuator spring is comprised of memory wire.

11. A method of inflating a flotation apparatus comprising a) covering an automated inflation device with an aqueous medium, wherein the automated inflation device comprises i) a housing with a cover, wherein the housing and cover are joined to each other with a watertight seal, and the housing has a first opening able to attach to a gas cylinder and second opening able to attach to a valve of a flotation apparatus;

ii) a manual release having a handle and a pull cord, wherein the manual release is connected to a manual release cam inside the housing;

iii) a trigger mechanism having a circuit board that is connected to a battery and at least one sensor, wherein the circuit board and the battery are enclosed within the housing, and the at least one sensor extends outside of the housing and is capable of detecting a presence of an aqueous medium;

iv) an automatic release mechanism having (1) a plunger arm that has a near end mounted on a first pivot pin and is constrained axially by the housing and cover, (2) a plunger arm stop that has a near end mounted on a second pivot pin and is constrained axially by the housing and cover, and (3) a plunger arm spring that has a first end engaged with the far end of the plunger arm and tension is applied to the plunger arm, wherein the plunger arm stop is engaged with the far end of the plunger arm and prevents an inactive plunger arm from rotating about the first pivot pin;

v) a piercing assembly having at least one O-ring and a piercing pin capable of penetrating an aperture of the gas cylinder;

vi) a fusible link having a first affixing feature at a near end, a second affixing feature at a far end;

vii) a resistance wire that is attached to or surrounds the fusible link;

b) activating the sensor to signal the circuit board that an aqueous medium has been detected;

c) causing a current to be sent from the battery to the resistance wire such that the fusible link is stretched, broken, or melted;

d) causing the plunger arm to rotate the plunger arm stop about its pivot pin counterclockwise such that the plunger is released within the cylinder plunger assembly;

e) allowing the plunger to pierce an aperture of a gas cylinder that is attached to the automated inflation device such that gas is released from the gas cylinder through the cylinder plunger assembly; and f) allowing the released gas to enter into the flotation apparatus through a valve of the flotation apparatus and cause a flotation bladder of the flotation apparatus to inflate.

12. The method of claim 11, wherein the fusible link has at least one notch along its length, and the resistance wire is attached to or surrounds the notch.

13. The method of claim 11, wherein the circuit board includes a testing means for detecting a false positive reading by a sensor and in the presence of a false positive reading prevents the circuit board from sending a current to activate the device.

14. The method of claim 13, wherein the testing means includes powering up an optical sensor receiver to determine if infrared light is detected; powering up a heat wire sensor circuit and heat wire circuit driver to verify that the resistance wire is intact; and using a battery voltage measurement circuit and circuit enable driver to measure battery voltage.

15. A method of making an automated inflation device comprising a) making a housing with a cover, wherein the housing and cover are joined to each other with a watertight seal, and the housing has a first opening able to attach to a gas cylinder and second opening able to attach to a valve of a flotation apparatus;

b) attaching a manual release having a handle and a pull cord, wherein the manual release is connected to a manual release cam inside the housing;

c) installing a trigger mechanism having a circuit board that is connected to a battery and at least one sensor, wherein the circuit board and the battery are enclosed within the housing, and the at least one sensor is capable of detecting a presence of an aqueous medium outside of the housing;

d) installing an automatic release mechanism having i) a plunger arm that has a near end mounted on a first pivot pin and is constrained axially by the housing and cover, ii) a plunger arm stop that has a near end mounted on a second pivot pin and is constrained axially by the housing and cover, and iii) a plunger arm spring that has a first end engaged with a far end of the plunger arm and tension is applied to the plunger arm, wherein the plunger arm stop is engaged with the far end of the plunger arm and prevents an inactive plunger arm from rotating about the first pivot pin; and e) attaching a bore having at least one O-ring and a piercing pin capable of penetrating an aperture of the gas cylinder.

16. The method of claim 15, wherein the housing and cover are comprised of an engineered resin.

17. The automated inflation device of claim 15, wherein the bore includes a collar.

18. The automated inflation device of claim 15, wherein two or more sensors connect to the circuit board.

19. The automated inflation device of claim 15 further comprising a fusible link having a first affixing feature at a near end, a second affixing feature at a far end, and at least one notch along its length; and a resistance wire is attached to or surrounds the notch.

20. The automated inflation device of claim 1, wherein the circuit board includes a testing means for detecting a false positive reading by a sensor.

21. The method of claim 15, wherein the circuit board includes a testing means for detecting a false positive reading by a sensor.

* * * * *